US011454064B1

(12) United States Patent
Campbell

(10) Patent No.: US 11,454,064 B1
(45) Date of Patent: Sep. 27, 2022

(54) STEP LADDER CARRIER

(71) Applicant: Sean D. Campbell, Urbana, IL (US)

(72) Inventor: Sean D. Campbell, Urbana, IL (US)

(*) Notice: Subject to any disclaimer, the term of this patent is extended or adjusted under 35 U.S.C. 154(b) by 370 days.

(21) Appl. No.: 16/269,632

(22) Filed: Feb. 7, 2019

Related U.S. Application Data

(60) Provisional application No. 62/634,950, filed on Feb. 26, 2018.

(51) Int. Cl.
*E06C 5/00* (2006.01)
*E06C 1/20* (2006.01)
*B60R 9/048* (2006.01)

(52) U.S. Cl.
CPC ............... *E06C 5/00* (2013.01); *E06C 1/20* (2013.01); *B60R 9/0485* (2013.01)

(58) Field of Classification Search
CPC ......... E06C 5/00; B60R 9/0485; B60R 9/042; B60R 9/0423; B60R 9/048
See application file for complete search history.

(56) References Cited

U.S. PATENT DOCUMENTS

| | | | | |
|---|---|---|---|---|
| 1,826,893 A * | 10/1931 | Larsen | ................ | B60R 9/02 248/201 |
| 2,080,527 A * | 5/1937 | Bixel | ................ | B60R 9/02 248/316.5 |
| 2,134,823 A * | 11/1938 | Herrmann et al. | ....... | B60R 9/02 248/509 |
| 3,105,667 A * | 10/1963 | Bauer | ................ | E06C 7/50 248/499 |
| 3,251,519 A * | 5/1966 | Jones | ................ | B60R 9/0485 224/324 |
| 3,411,607 A * | 11/1968 | Otten | ................ | E06C 9/14 182/76 |
| 3,672,612 A * | 6/1972 | Laing, Jr. | ............ | B60R 9/0485 248/503 |
| 3,722,766 A * | 3/1973 | Barrineau | ............ | B60R 9/0485 224/324 |
| 3,904,094 A * | 9/1975 | Correll | .................. | B60R 9/0485 224/324 |
| 4,390,117 A * | 6/1983 | Fagan | .................. | B60R 9/0485 182/127 |
| 4,618,083 A * | 10/1986 | Weger, Jr. | ............ | B60R 9/0485 224/309 |
| 4,813,585 A * | 3/1989 | Nutt | ..................... | B60R 9/0485 182/127 |
| 4,827,742 A * | 5/1989 | McDonald | ........... | B60R 9/0485 182/127 |
| 5,154,258 A * | 10/1992 | Krukow | ............... | B60R 9/0485 182/127 |

(Continued)

FOREIGN PATENT DOCUMENTS

| GB | 2496618 A * | 5/2013 | ........... B60R 9/0423 |
|---|---|---|---|
| GB | 2549070 A * | 10/2017 | ............... E06C 5/32 |

*Primary Examiner* — Daniel P Cahn
*Assistant Examiner* — Shiref M Mekhaeil
(74) *Attorney, Agent, or Firm* — Philip L. Bateman

(57) ABSTRACT

A step ladder carrier has an enclosure and a ladder securing assembly. The ladder securing assembly has a movable stop having an engaged position in which it engages a first step of a step ladder and having a disengaged position in which it does not engage a first step of a step ladder, the movable stop being moved between the engaged and disengaged positions by an externally accessible handle at the rear wall of the carrier.

12 Claims, 2 Drawing Sheets

(56) References Cited

U.S. PATENT DOCUMENTS

| | | | | |
|---|---|---|---|---|
| 5,242,094 | A * | 9/1993 | Finley | B60R 9/0485 182/127 |
| 5,918,488 | A * | 7/1999 | Deeter | B60R 9/0485 70/14 |
| 6,135,686 | A * | 10/2000 | Chasen | B60P 7/08 182/127 |
| 6,257,534 | B1 * | 7/2001 | Finley | B60R 9/0485 182/127 |
| 6,290,113 | B1 * | 9/2001 | Plyler | B60R 9/0485 182/127 |
| 6,523,730 | B2 * | 2/2003 | Anderson | B60R 9/0485 182/127 |
| 6,524,042 | B2 * | 2/2003 | Chasen | B60P 7/08 182/127 |
| 6,929,162 | B1 * | 8/2005 | Jordan | B60R 9/0485 224/282 |
| 6,973,996 | B2 * | 12/2005 | Huff | B60R 9/0485 182/127 |
| 7,083,045 | B2 * | 8/2006 | Scott | E06C 5/00 206/373 |
| 7,111,764 | B2 * | 9/2006 | Smith | B60R 9/0485 182/127 |
| 7,210,559 | B2 * | 5/2007 | Hickey | B60R 9/0423 182/127 |
| 8,182,013 | B1 * | 5/2012 | Alvarado | B60R 3/007 296/62 |
| 8,511,525 | B1 * | 8/2013 | Levi | B60R 9/0423 224/310 |
| 8,757,321 | B2 * | 6/2014 | Patterson | B60P 7/0853 182/82 |
| 9,156,411 | B2 * | 10/2015 | Elezaj | B60R 9/0423 |
| 9,347,201 | B2 * | 5/2016 | Capraro | E02F 9/0833 |
| 9,481,313 | B2 * | 11/2016 | Levi | B60R 9/0485 |
| D803,029 | S * | 11/2017 | Hosler | D8/338 |
| 10,011,235 | B2 * | 7/2018 | Hosler | B60R 9/0485 |
| 10,238,212 | B1 * | 3/2019 | Brown | F16M 13/027 |
| D849,506 | S * | 5/2019 | Hosler | D8/338 |
| 2001/0007627 | A1 * | 7/2001 | Chasen | B60P 7/08 410/120 |
| 2003/0034206 | A1 * | 2/2003 | Carroll, Jr. | E06C 5/00 182/127 |
| 2004/0188177 | A1 * | 9/2004 | Scott | E06C 5/00 182/129 |
| 2005/0128442 | A1 * | 6/2005 | Huff | B60R 9/0485 353/119 |
| 2005/0241879 | A1 * | 11/2005 | Hickey | B60R 9/0423 182/127 |
| 2007/0023232 | A1 * | 2/2007 | Eastwood | E06C 5/00 182/127 |
| 2009/0120719 | A1 * | 5/2009 | Foulke | E06C 7/00 182/129 |
| 2011/0042432 | A1 * | 2/2011 | Elezaj | B60R 9/0423 224/321 |
| 2011/0214944 | A1 * | 9/2011 | Levi | B60R 9/0485 182/127 |
| 2016/0325690 | A1 * | 11/2016 | Hosler | B60R 9/0485 |
| 2018/0186298 | A1 * | 7/2018 | Parker | B60R 9/0485 |

\* cited by examiner

STEP LADDER CARRIER

CROSS-REFERENCE TO RELATED APPLICATION

This application claims the benefit of U.S. Provisional Application Ser. No. 62/634,950, Feb. 26, 2018.

FIELD OF THE INVENTION

This invention relates to step ladders. More particularly, this invention relates to enclosed carriers for step ladders.

BACKGROUND OF THE INVENTION

Step ladders are self-supporting, portable ladders hinged at the top to form an inverted V with locking spreader arms to keep the two sections at a fixed angle. Each section has two vertical rails with two feet. The front section has flat steps (rungs) extending between the vertical rails and the rear section has horizontal reinforcing members extending between the vertical rails. Each section has the general shape of an isosceles trapezoid (a base and a top that are parallel and two sides that are of equal length) with a base that is broader (wider) than its top. The steps of a step ladder are typically numbered from bottom to top. For example, the first step of a step ladder is the one closest to the base. Step ladders are widely used and vary in height from about four feet to twenty feet. Step ladders for use inside houses are typically about six feet to ten feet in height. Unless otherwise indicated expressly or by context, the term "about" is used herein to mean plus or minus 25 percent of the measurement or other quantified property referenced.

Contractors, repairmen, installers, and workers in many other industries often carry step ladders to job sites on their vehicles. In many cases, step ladders are carried on elevated racks on the vehicles. A major disadvantage of carrying step ladders in this way is that the step ladders are exposed to the elements. Such exposure causes deterioration of the steps ladders and also creates problems for use when the step ladders are wet or covered with ice or snow. Other disadvantages of carrying step ladders in this way include the time it takes to attach the ladders to the racks, the danger of the ladders falling off the vehicle, and the danger of theft.

Step ladders are sometimes carried in enclosed carriers. Enclosed overhead carriers are well known, but are generally not big enough to carry step ladders. Those carriers that are big enough to carry step ladders generally have no way to prevent the ladders from sliding around during transport. The sliding can damage the ladders and the enclosure. The sliding is also disconcerting to the occupants of the vehicle.

Carriers especially made for step ladders are known. Scott, U.S. Pat. No. 7,083,045, Aug. 1, 2006, discloses a carrier for step ladders. The ladder is inserted into the carrier feet first, thus requiring the ladder to be inverted before being loaded. Straps with hooks inside the carrier are then used to bias the ladder toward the front of the carrier and to thereby secure the ladder in place. Eastwood et al., U.S. Pat. Appln. Publn. No. 2007/0023232, Feb. 1, 2007, disclose a carrier for step ladders having multiple compartments to accommodate different sizes and shapes of ladders. The carrier has no mechanism to secure a ladder in place if placed into an oversized enclosure.

Accordingly, there is a demand for an improved step ladder carrier that accommodates step ladders of varying size, that enables the ladder to be loaded top first, and that secures the ladder in position with an externally accessible handle.

SUMMARY OF THE INVENTION

The general object of this invention is to provide an improved ladder carrier that accommodates step ladders of varying size, that enables the ladder to be loaded top first, and that secures the ladder in position with a movable stop that engages the first step of the ladder and that is operated by an externally accessible handle.

I have invented an improved step ladder carrier. The step ladder carrier comprises: (a) an enclosure having an isosceles trapezoidal base, an isosceles trapezoidal roof that overlies the base, a front wall, two side walls, and a rear wall having a door; and (b) a ladder securing assembly comprising a movable stop having an engaged position in which it engages a first step of a step ladder and having a disengaged position in which it does not engage a first step of a step ladder, the movable stop being moved between the engaged and disengaged positions by an externally accessible handle.

The step ladder carrier of this invention accommodates step ladders of varying size, enables the ladder to be loaded top first, and secures the ladder in position with a movable stop that engages the first step of the ladder and that is operated by an externally accessible handle.

DETAILED DESCRIPTION OF THE INVENTION

Figure 1:
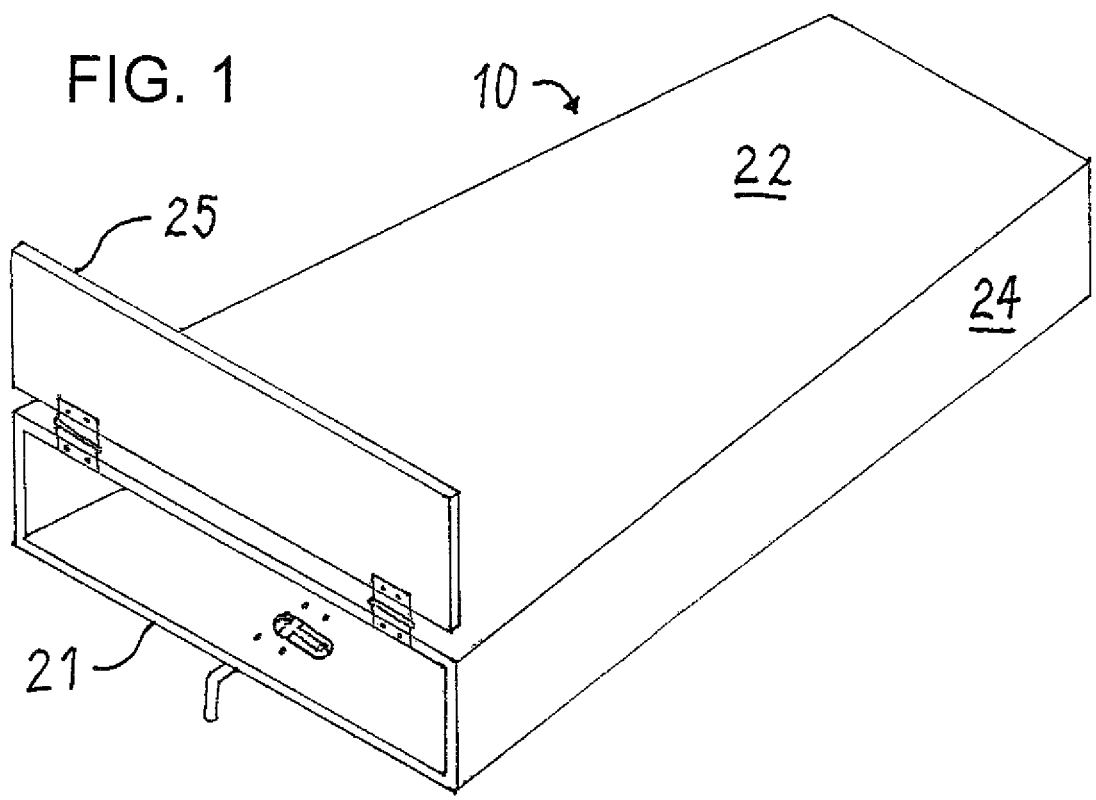
FIG. 1 is a rear and right side perspective view of a preferred embodiment of the step ladder carrier of this invention with the door open and with the ladder securing bars in a disengaged position.

This invention is best understood by reference to the drawings. Referring to FIGS. 1 to 4, a preferred embodiment of the step ladder carrier 10 of this invention comprises an enclosure 20 and a ladder securing assembly 30. The components of the step ladder carrier are discussed in more detail below. The step ladder carrier is especially useful for carrying a step ladder 40.

The enclosure 20 has a base 21, a roof 22, a front wall 23, side walls 24, and a rear wall 25. The terms "front" and "rear" are based on the direction of travel when the carrier is mounted on a vehicle. The shape of the enclosure is a matter of choice depending on the shape of the step ladder to be carried. The base and the roof are preferably shaped to conform to the shape of the ladder to be carried. For example, the base and roof are preferably generally shaped as isosceles trapezoids (wider at the bottom than at the top) if intended to carry a step ladder. The base and roof are preferably shaped as rectangles if intended to carry extension ladders or other rectangular ladders. The roof overlies the base and is generally parallel to it. The side walls are generally vertical. The front wall is vertical or slightly sloped to reduce wind resistance. The rear wall contains a door to provide access the interior of the enclosure. In the preferred embodiment, the entire rear wall is the door. In the preferred embodiment, the door hinges at the top so that the possibility of damage to the hinge during loading or unloading is minimized. If desired, the door can hinge on a side or at the bottom. If desired, support struts are added to the door so it is supported in the open position during loading and unloading of the step ladder. The door preferably contains a latch to hold it in the closed position. If desired, the door contains a lock.

Figure 3:
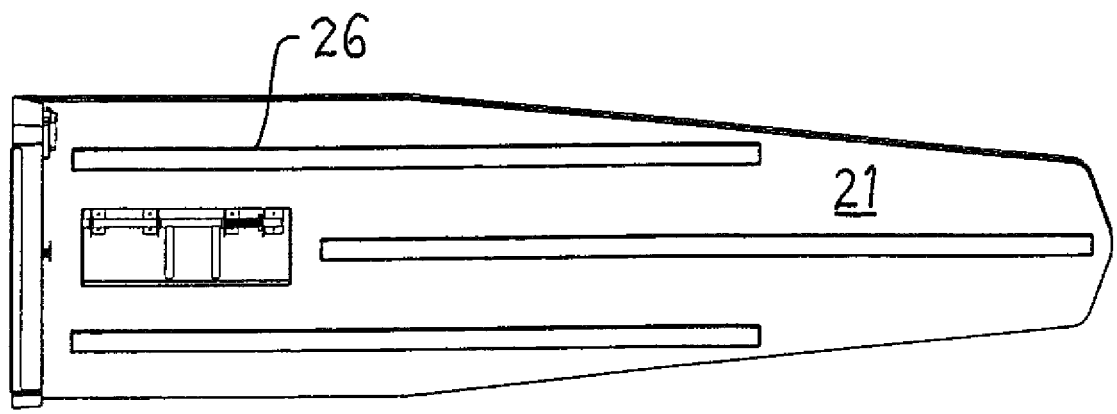
FIG. 3 is a bottom plan view thereof.

The size of the enclosure is a matter of choice depending on the size of the step ladders to be carried. The enclosure is generally about six to twelve feet in length. The height of the enclosure is generally about one to two feet for carrying a single ladder. If the ability to carry two or more ladders is desired, the height is increased correspondingly. The enclosure is made of a durable waterproof material such as thermoplastic or metal. Polyethylene and aluminum are two preferred materials because of their light weight and relatively low cost. The base of the enclosure generally has rails, brackets, openings, or the like for attachment to the vehicle. Rails and brackets also provide reinforcing strength to the base. As seen in FIG. 3, the preferred embodiment contains rails 26 attached to, or molded into, the bottom of the enclosure. These rails are used to attach the enclosure to the roof rack of the vehicle and also provide reinforcement to the enclosure.

Figure 4:
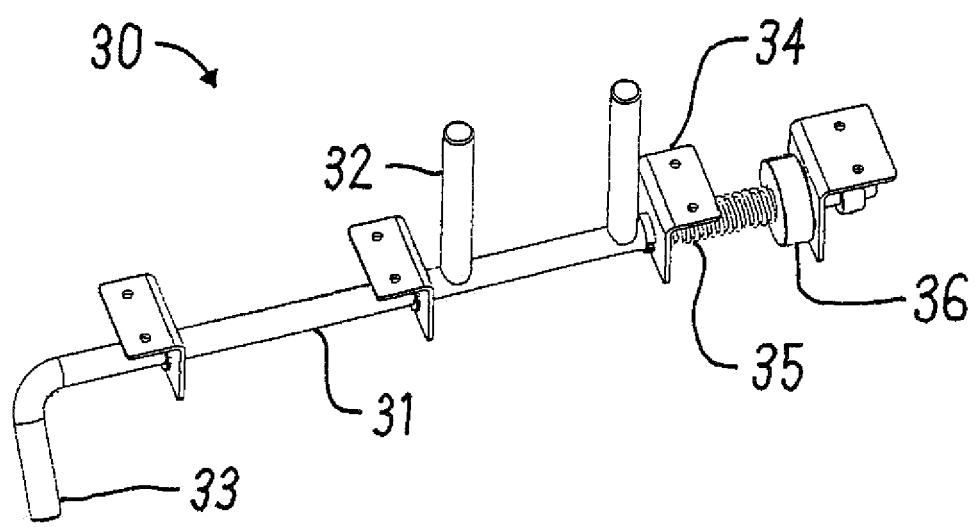
FIG. 4 is a detailed perspective view of the ladder securing assembly separate from the enclosure.

The ladder securing assembly 30 secures the step ladder at the rear of the enclosure. It thus prevents ladders having a height less than the length of the enclosure from shifting forward and backward during transport. Accordingly, the step ladder carrier can transport step ladders that fit tightly within the enclosure and can also transport step ladders that are smaller without shifting. The ladder securing mechanism has two positions. In its engaged position, a stop engages the first step (the lowest rung) of the ladder. In its disengaged position, the stop is retracted and does not interfere with the loading or unloading of the step ladder. A preferred embodiment of the ladder securing assembly is shown in FIG. 3 attached to the bottom of the enclosure and is shown in FIG. 4 unattached to the enclosure for illustration purposes. In the preferred embodiment, the ladder securing mechanism is a horizontal bar 31 having two spaced apart and parallel risers (tongs) 32 perpendicular to the bar. An externally accessible handle 33 attached to the rearward end of the bar is rotated 90 degrees to move from the engaged position where the risers are vertical to the disengaged position where the risers are horizontal. The horizontal bar is attached to the underside of the enclosure base with pillow block brackets 34 and the risers pass through slots in the base. The preferred ladder securing assembly is shown in the disengaged position in FIG. 1 and in the engaged position in FIG. 2.

The ladder securing assembly is preferably at the rear wall of the enclosure so that its externally accessible handle can be easily reached by a person standing at the rear. The term "externally accessible" is used herein to mean something that is on the outside of the enclosure. The term "handle" is used herein to refer to any type of handle or other actuator (button, release, latch, etc.) that is used to engage and disengage the assembly. The handle of the preferred assembly is generally within about two feet of the rear wall of the enclosure and is preferably within about one foot of the rear wall of the enclosure. In the preferred embodiment shown, the handle is within about six inches of the rear wall of the enclosure.

The ladder securing assembly preferably includes a biasing and/or a locking mechanism so that it stays in the desired position during transport. In the preferred embodiment, the assembly has a biasing mechanism comprising a helical spring 35 that surrounds the bar and forces a donut-shaped ring member 36 against the pillow block bracket at the opposite end from the handle. A variety of other ladder securing assemblies are suitable, including spring pop-up risers, risers that travel forward or backward rather than to the side, stops attached to a door that automatically secure the first step when the door is closed, and so on.

Figure 2:
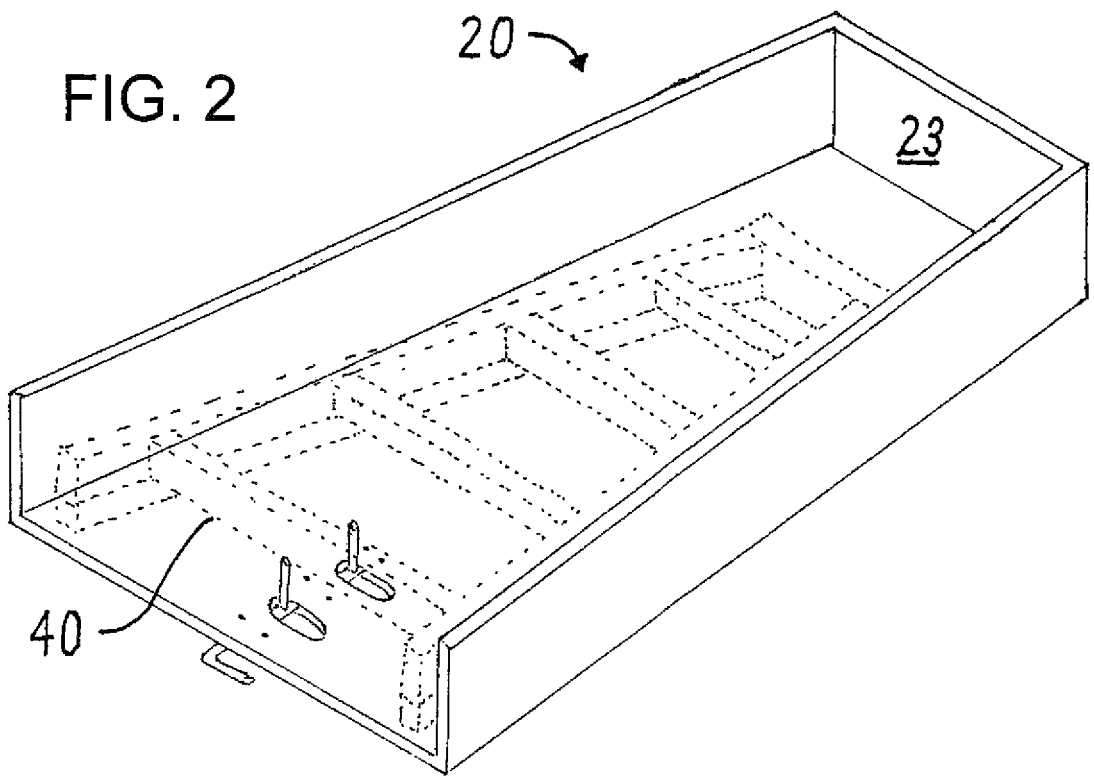
FIG. 2 is a rear and right side perspective view thereof with the door and roof omitted for illustration purposes, with the ladder securing bars in an engaged position, and with a step ladder shown in phantom lines.

The use of the step ladder carrier can now be considered. The step ladder carrier is first attached to a vehicle or a rack on a vehicle in a conventional manner. To load a step ladder, the door of the enclosure is opened and the ladder securing assembly is placed in its disengaged position as shown in FIG. 1 (if not already in that position). The step ladder is positioned by the door in a folded and upright position. The step ladder is then lifted, tilted, and inserted into the carrier, top first, until the foot of the step ladder is just barely inside the enclosure. The ladder securing assembly is then moved to the engaged position, causing the two risers to rise up on opposite sides of the first step of the ladder as shown in FIG. 2. As previously discussed, the ladder securing assembly is accessed from the rear so the person loading the ladder does not need to move to a different position to secure it after loading. And, as previously mentioned, the handle of the ladder securing assembly is outside the enclosure so the person loading the ladder does not need to reach inside the enclosure. The door is then closed and, if desired, locked. The step ladder is secured and cannot shift forward during transport. To unload the step ladder, the steps are reversed. The entire loading and unloading procedure is performed from a single location, directly adjacent the rear of the enclosure.

The step ladder carrier of this invention accommodates step ladders of varying size, enables the ladder to be loaded top first, and secures the ladder in position with a movable stop that engages the first step of the ladder and that is operated by an externally accessible handle at the rear of the carrier.

I claim:

1. A step ladder carrier comprising: (a) an enclosure having an isosceles trapezoidal base, an isosceles trapezoidal roof that overlies and is generally parallel to the base, a front wall, two side walls, and a rear door; wherein the enclosure is configured to contain a step ladder; and (b) a ladder securing assembly comprising a movable stop having an engaged position in which the movable stop is configured to engage a first step of the step ladder and having a disengaged position in which the movable stop does not engage the first step of the step ladder, the movable stop being moved between the engaged and disengaged positions by an externally accessible handle and; the ladder securing assembly comprises a biasing mechanism to selectively hold the assembly in the engaged position or the disengaged position.

2. The step ladder carrier of claim 1 wherein the movable stop of the ladder securing assembly comprises two spaced apart and parallel risers.

3. The step ladder carrier of claim 2 wherein the base of the enclosure contains two slots to accommodate the risers.

4. The step ladder carrier of claim 1 wherein the biasing mechanism comprises a helical spring that selectively holds the assembly in the engaged position or the disengaged position.

5. The step ladder carrier of claim 1 wherein the handle of the ladder securing assembly is within about one foot of the rear door of the enclosure.

6. A ladder carrier comprising: (a) an enclosure having an isosceles trapezoidal base, an isosceles trapezoidal roof that overlies and is generally parallel to the base, a front wall, two side walls, and a rear door; wherein the enclosure is configured to contain a step ladder and (b) a means for engaging and disengaging a first step of the step ladder, the means having an externally accessible actuator and; the means for engaging and disengaging the first step of the step ladder comprises a biasing mechanism to selectively hold said means for engaging and disengaging in an engaged position or a disengaged position.

7. The ladder carrier of claim 6 wherein the actuator is adjacent the rear door of the carrier.

8. The ladder carrier of claim 7 wherein the means comprises a ladder securing assembly having two spaced apart and parallel risers.

9. The ladder carrier of claim 6 wherein the biasing mechanism comprises a helical spring that holds the assembly in the engaged position or the disengaged position.

10. The ladder carrier of claim 9 wherein the actuator of the means for engaging and disengaging comprises a handle located within about one foot of the rear door of the enclosure.

11. An assembly comprising: (a) a step ladder comprising a front section having spaced apart rails connected by steps and a rear section having spaced apart rails connected by reinforcing members, the front section and the rear section having tops connected by a hinge; and (b) a step ladder carrier comprising: (i) an enclosure having an isosceles trapezoidal base, an isosceles trapezoidal roof that overlies the base, a front wall, two side walls, and a rear door; wherein the enclosure is configured to contain the step ladder and (ii) a means for engaging and disengaging a first step of the ladder and; the means for engaging and disengaging the first step of the ladder comprises a biasing mechanism to selectively hold said means for engaging and disengaging in an engaged position or a disengaged position.

12. The assembly of claim 11 wherein the means for engaging and disengaging the first step of the ladder comprises an externally accessible handle.

* * * * *